May 5, 1953 H. D. CULVER 2,637,268
CLAMPING DEVICE
Filed Aug. 21, 1948 2 SHEETS—SHEET 1
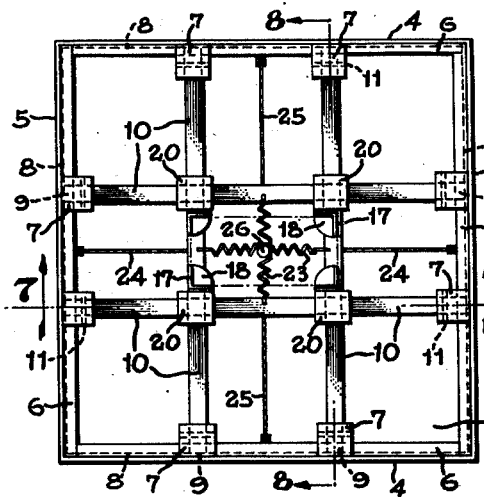
Fig. 2
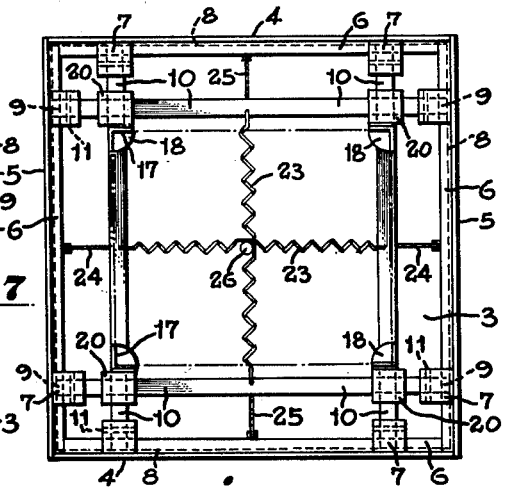
Fig. 3
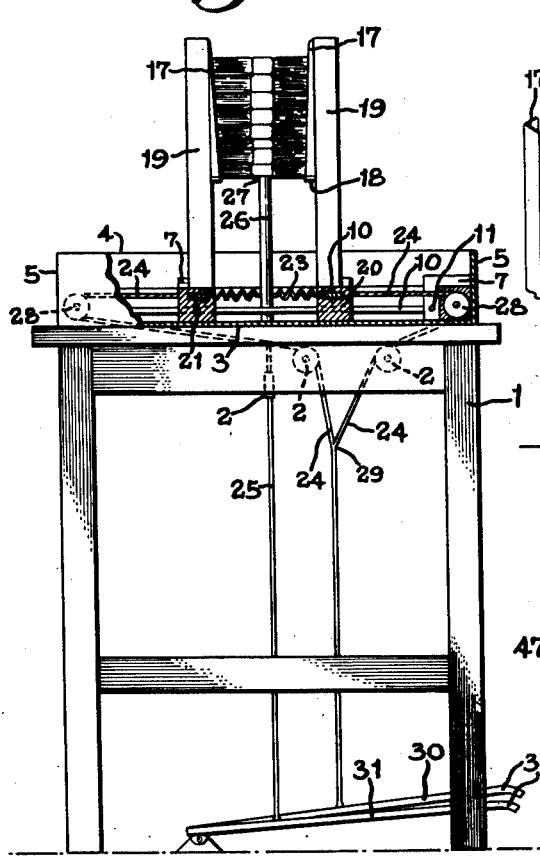
Fig. 1
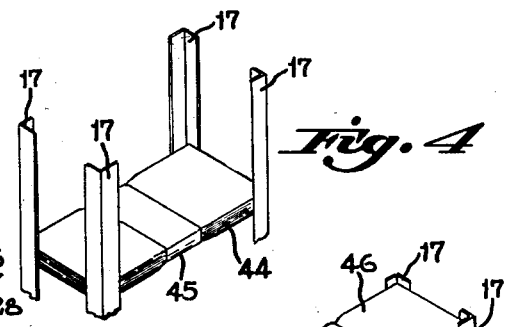
Fig. 4
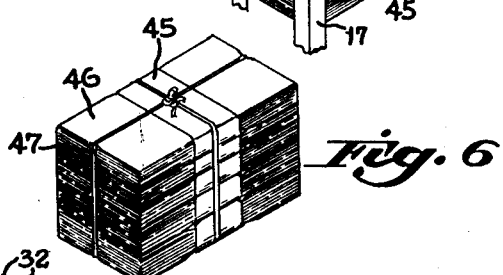
Fig. 6
Fig. 5
INVENTOR.
HARRY D. CULVER.
BY George A. Schwenger
ATTORNEY May 5, 1953  H. D. CULVER  2,637,268
CLAMPING DEVICE
Filed Aug. 21, 1948  2 SHEETS—SHEET 2
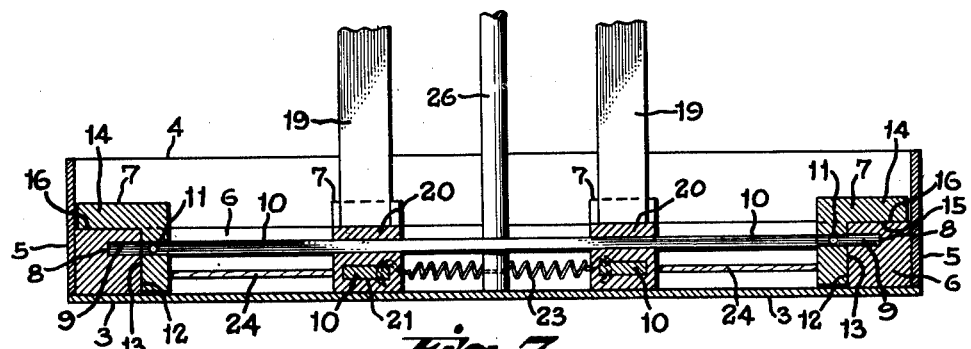
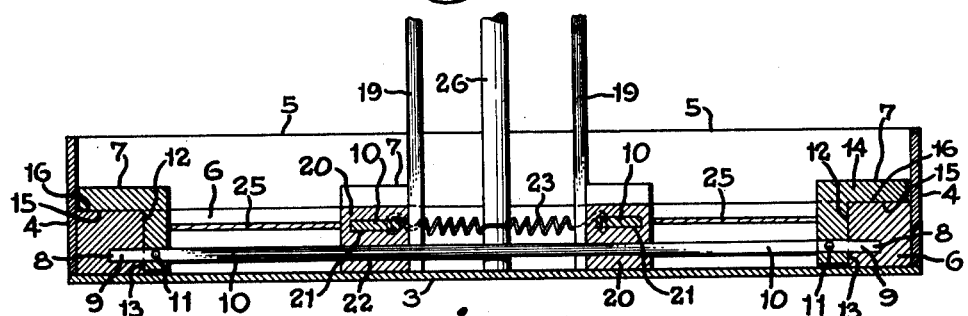
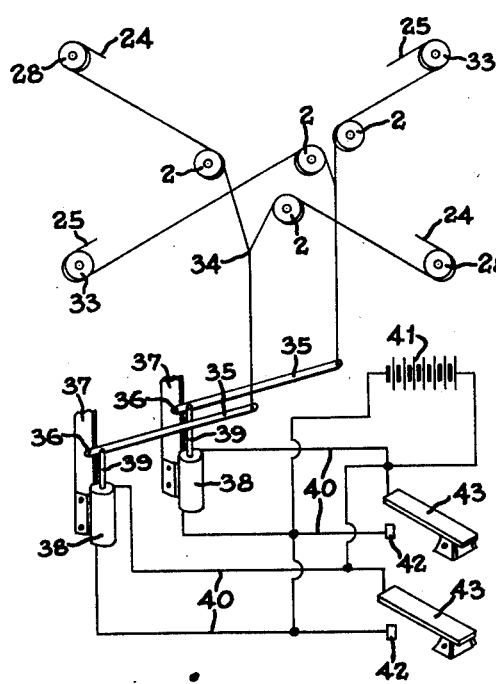
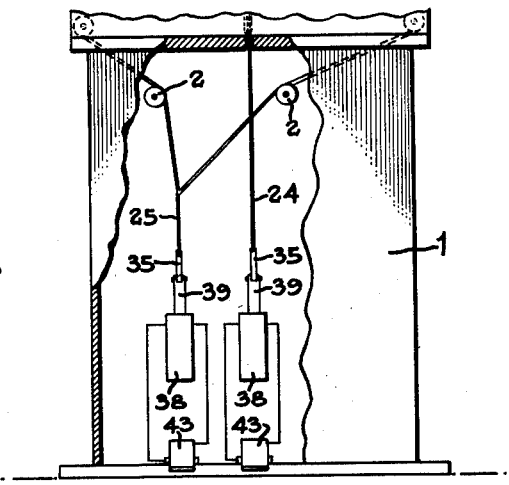
INVENTOR.
HARRY D. CULVER.
BY
George A. Schwenzer
ATTORNEY Patented May 5, 1953

2,637,268

UNITED STATES PATENT OFFICE 2,637,268

CLAMPING DEVICE

Harry D. Culver, Bellevue, Ky., assignor of one-third to John C. McCarthy and one-third to George A. Schwenzer, Cincinnati, Ohio Application August 21, 1948, Serial No. 45,478

18 Claims. (Cl. 100—232)

This invention relates to fixtures or devices for use in packaging sheet materials such as stacks of paper sheets. More specifically the invention resides in a foot controlled device which holds the stacks of sheets in alignment to facilitate the application of a cord or tape to form a compact package.

The object of my invention is to provide a holding fixture in the form of self-adjusting clamping device for laminated bundles or stacks of sheet materials.

Another object of my invention is to facilitate the holding and shaping of laminated bundles or stacks of sheet materials while the bundles or stacks are being bound or tied together.

A further object of my invention is to provide a clamping device that can be operated electrically or mechanically by pedals to hold stacks of laminated materials, and to leave the hands of any operator free to tie the laminated stacks or bundles together and to overcome the inherent movement between the laminated sheets forming the bundle while binding or tying them together.

It is also an object of my invention to provide a clamping device for packages or boxes to be over wrapped whereby they can be held independently and leave the operator's hand free to perform the tying operation without the hindrance of slippage or distortion of the package during the tying operation.

The foregoing and other objects will be more specifically pointed out in these specifications. In the description like parts will be identified by identical numbers.

In the drawings:

Figure 1 is a side view in elevation of my clamping mechanism.

Figure 2 is a top plan view of my clamping mechanism showing the clamp contracted to the smallest size of package.

Figure 3 is a top plan view of my clamping device showing the clamp expanded to the extreme size for a package.

Figure 4 is a view in perspective of the clamping posts with a bundle of wrapped paper sheets or money between them.

Figure 5 is a view in partial perspective showing the clamping posts filled with several bundles of wrapped sheets or money before tying.

Figure 6 is a view in perspective of a bundle securely tied.

Figure 7 is a view in elevation of the clamping mechanism taken on line 7—7 of Figure 2.

Figure 8 is a view in elevation of the clamping mechanism taken on line 8—8 of Figure 2.

Figure 9 is a diagrammatic perspective view of an electrical system with the pedal controls for the clamp actuating mechanism.

Figure 10 is a view in front elevation of the clamp actuating mechanism.

The bundling or tying together of stacks of paper sheets or money is an awkward operation because the sheets slide relative to each other. Unless the sliding action is prevented the bundles will be loose and their sizes variable. Loose bundles cannot be handled very easily and they also occupy more space in storage. This is particularly true of paper money where firm compact bundles are necessary so that they will remain together and intact after counting and bundling.

Paper sheets and money especially are very limp and hence elusive to bundling without difficulty. Due to the limber condition of paper sheets or money more time and effort are spent to keep the bundle in shape during the tying together than the actual operation of the tying or wrapping cord or bands.

My clamping device acts as a gage to properly position the sheets and align them so that the bundles of sheets of the same size will be uniform in dimension. Since the sheets cannot slide on each other they are more readily compressed and pulled together while being tied and as a result a more compact bundle is produced.

My clamping device when used to over wrap bundles with an outside paper wrapper also produces a neater and tighter over wrapped package, because the operator performs only the function of tying and does not divide his efforts to keep the outside wrapper in place.

Referring to Figures 1, 2 and 3 it will be seen that I have shown my clamping device mounted on a table or stand 1. This table or stand is also used to mount sheaves 2 and a pedal operating mechanism (to be described).

A base 3 is secured to the table or stand and has side walls 4 and end walls 5 to which are fixed rails 6 upon which are slidably mounted shoes or cross slides 7. The rails 6 have slots 8 their entire length for slidably mounting ends 9 of guide bars 10. The ends 8 of the guide bars act as keys and keep the guide bars slidable in a fixed plane. The shoes or cross slides 7 are fixed to the guide bars by pins 11 so that a perpendicular surface 12 of the shoes will remain parallel and in slidable contact with vertical surfaces 13 of the rails. The shoes or cross slides are L shaped and have a horizontal leg 14 and an underside 15 of the horizontal leg is slidably engaged on a top surface 16 of the rails. The shoes keep the guide bars 10 in slidable perpendicular relation to the rails.

There are two pairs of guide bars. One pair of the guide bars are retained parallel and in slidable relation to each other and extend between the side walls 4 and the other pair of guide bars are also retained parallel and in slidable relation to each other but perpendicular and in slidable relation to the other pair of guide bars and extend between the end walls 5. Each pair of guide bars are and move at right angles to the other pair of guide bars. The guide bars are arranged to move relative to each other individually, and independent of each other, in pairs independent of the other or simultaneously with relation to each other. Normally all the guide bars move equidistant to or from each other when they are moved by an operating mechanism (to be described).

There are four right angular shaped jaws 17 for clamping and gaging sheet material to be bundled or packaged. The jaws are spaced apart and each has a horizontal base plate 18 upon which the sheets rest and sufficiently high above the base so that an operator can reach in between the jaws and underneath a stack of sheets while tying them together. Integral with and supporting the jaws are posts 19 that are supported on and fixed to bearing slide blocks 20. The bearing slide blocks have holes 21 and 22 through them and these holes are at different levels at right angles to each other through which the guide bars 10 are free to slide. Each of the bearing slide blocks can move individually independent of the other, in pairs independent of the other pair or simultaneously relative to each other. In addition to being movable on and relative to the guide bars they can move in relation to each other on their own supporting guide bar. The guide bars are the means for actuating the jaws.

Torsion springs 23 are connected between each pair of guide bars and pull the guide bars comprising a pair towards each other and the common axial center of my clamping device. These springs are in line with cables 24 and 25. The cables actuate the guide bars in pairs and when operated on by a mechanism (to be described) pull the guide bars apart towards the end and side walls 4 and 5. When the pull on the cables is released the springs will react and pull the guide bars together towards the axial center of my clamping device and keep them in that position.

On the axial center of my clamping device there is a column 26 with a top 27 in a plane on level with the bottom 18 of the jaws. The top of the column acts as a center rest and supporting stop for the sheets or package and prevents undue sagging while stacking and tying the materials held between the jaws.

In Figure 1, I have illustrated a mechanism to operate my clamping device. The cables 24 extend around sheaves 28 and 2 and are joined together to form a single continuous cable 29 which extends down to and is swivel connected to a foot operated lever 30. The other cables 25 are also joined together to form a single and continuous cable and extend down to another foot operated lever 31. When the end 32 of either foot lever is moved downward its corresponding cable 24 or 25 will also be pulled downward and move the guide bars, and in turn the jaws, away from each other and enlarge the space between them. When pressure is removed from the pedal ends the springs acting on the guide bars will pull the jaws to closed position.

In Figures 9 and 10 I have illustrated an electrically actuated operating mechanism. In this mechanism the cables 24 extend from the guide bars, around rotatable sheaves 28 and 2 respectively and are joined together to form single cables 34 which extend downward and are swivel connected to levers 35. The levers 35 are pivotly mounted on pins 36 which are fixed to any suitable fixed member 37 on my table or stand. Fixed to this same member 37 are solenoids 38 with plungers 39. The plungers 39 are pivotly connected to and actuate the levers 35. An electric circuit 40 is energized by a battery 41 or other electrical source when a switch 42 is closed by a particular foot treadle 43. When either or both of the solenoids are energized the plungers 39 will pull on the levers 35 and they in turn will pull on the cables the respective cables connected to them and move the clamps apart to open position.

To operate my device the operator steps on both of the foot treadles which actuate the cables that pull on the guide bars. The guide bars when actuated by the cables cause the slide bearing blocks and jaws to slide along the guide bars. All of the jaws can be moved simultaneously or only one pair of jaws can be moved by operating just one of the foot pedals. When the guide bars are pulled apart the space between the jaws will be enlarged and conversely when the guide bars are pulled towards each other the space between the jaws is decreased. When the jaws are apart a quantity of sheets or money 44 is placed on top of the center column with the ends raised slightly above the plane of the top of the column and the base of the jaws. Pressure on the pedal or pedals is then released and the springs will draw the jaws towards the center of my clamping device until the jaws contact the stacks of sheets or money to be packaged. Usually a small number of sheets are used to gage the spacing of the jaws and hold them at the proper distance apart. Thereafter, other sheets placed on top of the base layer will self-align themselves and this aligning action produces uniform dimensioned packages for the same size of sheets. When the clamps grip the package a wrapper 45 previously placed on top of the column can be folded around the package and pasted to hold the stack in compact condition. For each succeeding individual stack as shown in Figure 5 the wrapper is placed on top of the previously wrapped package. In Figures 1 and 5 I have shown how individual packages 44 can be held and combined into a master package 46 by tying them together with a string 47 while they are in the clamp as shown in Figure 1. The open areas between the top of the column and base permits unobstructed and easy access for the hands while applying the string 49 around and tying the packages securely together.

Having described my invention and desiring to secure Letters Patent, I claim:

1. In a clamping device for bundling laminated packages comprising; a frame, multiple jaw means with base plate means for holding and positioning laminated materials of said packages, slidable means for supporting and moving said holding means positioned on different plane levels and in pairs supported endwise on said frame, perpendicularly arranged slidable means mounted to move transverse each to the other for supporting and moving said first slidable means to simultaneously move said holding means.

2. In a clamping device for bundling laminated packages comprising; jaws arranged in a quadrangle, slide blocks supporting said jaws, slidable guide bars positioned on different plane levels and arranged perpendicular each to the other for supporting and moving said slide blocks, said slide blocks movable relative to each other and on and relative to said guide bars, and electrically energized actuating means to move said guide bars.

3. In a clamping device for bundling laminated materials into packages comprising; multiple gripping and positioning means, slidable bearing block means supporting said gripping and positioning means, slidable guide bars arranged perpendicular each to the other slidably supporting said slidable bearing blocks, means for moving said guide bars individually parallel and perpendicularly each to the other, electrical means for actuating the means for moving said guide bars, and a pedal actuated switch means to energize said electrical means and thereby move said guide bars individually parallel and perpendicularly on different plane levels each to the other and actuate said gripping means.

4. In a clamping device for bundling sheet materials comprising; jaws arranged in a quadrangle, slide bearing blocks fixed to said jaws, slidable guide bars positioned on different plane levels arranged in pairs transverse each to the other movable transversely and perpendicular to each other, said slide bearing blocks slidable on said guide bars and movable therewith, cable means for moving said guide bars, and pedal means for actuating said cables and moving said jaws and guide bars simultaneously relative to each other.

5. In a clamping and holding device for bundling sheet materials comprising; jaws arranged in pairs to form a quadrangle, slide bearing blocks fixed to each of said jaws, slidable parallel guide bars arranged in pairs on different plane levels and said pairs of slidable parallel guide bars adapted to slide transversely to each other, said slide bearing blocks slidable on and actuated by said slidable parallel guide bars relative to each other and in relation to a supporting guide bar simultaneously, and cable means for actuating said pairs of guide bars simultaneously or individually to vary the size of the quadrangle formed by said jaws.

6. In a device for tying sheets of materials in bundles, having jaws arranged in a quadrangle to hold and position sheets of material while tying them together, slide bearing blocks fixed to said jaws, slidable guide bars for slidably supporting and moving said slide bearing blocks, a base and guide rails secured to said base, shoes fixed to said guide bars and slidable on said guide rails to keep said guide bars in parallel and rectilinear relation while said guide bars are in motion, cable means connected to parallel pairs of guide bars, and pedal means for actuating said cable and a respective pair of guide bars simultaneously or separately to change the position of the said jaws and accommodate them to variable sizes of bundles to be tied.

7. A clamping device having a plurality of jaws with horizontal base plates adapted to move relative to and independent to each other comprising; a main frame, guide bar means slidably supported endwise on said frame, and slide bearing blocks supporting said jaws and slidably mounted on said guide bar means, said guide bar means arranged in multiple parallel pairs positioned on different plane levels and perpendicular to each other to actuate said jaws.

8. A clamping device having a plurality of jaws adapted to move relative to and independent of each other comprising; a main frame, guide bar means supported endwise movable in said main frame arranged in parallel pairs, and disposed perpendicular to each other, slide bearing blocks fixed to said jaws movable in pairs on and along and slidably connecting said guide bar means to move said jaws relative to and independent each to the other.

9. A clamping device having a plurality of jaws adapted to move relative to and independent of each other comprising; a frame, guide means supported endwise and slidable on said frame and arranged in pairs and disposed at right angles each to the other on different plane levels, and slide bearing blocks fixed to the said jaws mounted on and slidably connecting said guide means into an expandable parallelogram and adapted to move on and along on the said guide means while moving relative to or independent of each to the other to actuate said jaws.

10. A clamping device having a plurality of jaws adapted to move relative to and independent of each other comprising; a frame, guide bar means slidably mounted endwise and guided on said frame, said guide bar means arranged in spaced pairs disposed at right angles each to the other and on different plane levels, slide bearing blocks fixed to said jaws mounted on and slidably connecting said guide bar means and adapted to move on and along said guide bar means, said jaws arranged in pairs and any one of said jaws comprising a pair of jaws movable relative to its mating jaw while moving relative to another pair of jaws upon movement of said guide bar means.

11. A clamping device having a plurality of jaws adapted to move relative to and independent of each other comprising; a frame, guide bar means slidably mounted on ends thereof on said frame arranged in pairs and said pairs disposed at right angles each to the other on different plane levels, slide bearing blocks fixed to said jaws mounted on and slidable along and with said guide bar means, said guide bar means being slidably mounted in said slide bearing blocks at right angles each to the other adapted to move the said jaws relative to or independent of each other and relative to one of said jaws held in a stationary position.

12. A clamping device having a plurality of jaws adapted to move relative to or independent of each to the other comprising; a frame, guide bar means arranged in pairs on different plane levels slidably supported endwise and guided on said frame, slide bearing blocks fixed to said jaws slidably mounted on and adapted to move along and with said guide bar means and actuated by said guide bar means when said guide bar means are moved transverse to each other and said jaws adapted to move in pairs relative to each other.

13. A clamping device having a plurality of jaws arranged in a quadrangle comprising; a frame, guide bar means slidably guided on said frame arranged in pairs and disposed at right angles each to the other on different plane levels, slide bearing blocks fixed to said jaws slidably mounted on said guide bar means and adapted to move on and along said guide bar means when said guide bar means are actuated, and pedal means for actuating said pairs of guide bar means simultaneously or separately in pairs.

14. A clamping device having a plurality of jaws arranged in pairs movable relative to and independent of each other in pairs or individually comprising; a frame, a plurality of guide bar means slidable on said frame, slide bearing blocks supporting said jaws and connecting said guide bar means at right angles and in different planes and said guide blocks being movable on and along said guide means when said guide means are actuated, and a plurality of pedal means adapted to actuate said guide bar means and the jaws in pairs relative each to the other or simultaneously each to the other.

15. A clamping fixture for bundling sheet materials comprising; respective pairs of parallel guide bars, said pairs of bars being disposed one above the other and at right angles to each other, stationary guide rails slidably engaging the opposite ends of the bars of each of said pairs, bearing blocks slidably connecting the respective upper and lower bars of each pair at the intersection thereof to guide the bars of each pair for parallel lateral movement relative to each other, a standard secured to each of said bearing blocks adapted to engage the corners of a bundle of sheet material, and means for adjusting the respective bars of each pair relative to each other to vary the position of said bearing blocks and standards to receive and engage the corners of a bundle of sheet material.

16. A clamping fixture for bundling sheet materials comprising; a base, guide rails secured to said base, a pair of parallel bars, each of said bars having its opposite ends slidably engaged with said guide rails, a second pair of parallel bars disposed above and at right angles to said first mentioned pair, each of said bars having its opposite ends slidably engaged with said guide rails, respective bearing blocks connecting said bars together at the intersection of each upper and lower bar, an angular standard adapted to embrace the corner of a bundle of sheet material secured to each of said bearing blocks, and means connected to each of said bars respectively to move the bars of each respective pair toward or from each other to vary the opening defined by said standards to clamp various sized bundles of sheet materials therebetween for fastening.

17. A clamping fixture for bundling sheet materials comprising; fixed rails arranged in a quadrangle, respective pairs of parallel guide bars slidable in said guide rails, said pair of bars being disposed one above the other and at right angles to each other, means for guiding said bars for movement relative to each other in their respective planes, the respective guide bars of each pair being connected together by means of bearing blocks slidably engaging the upper and lower movable bar of each individual pair, means for moving said movable bars in parallelism laterally relative to each other to adjust the position of said guide blocks, and a standard secured to each of said bearing blocks to receive a package of sheet material therebetween and to hold the same in assembled relationship for fastening.

18. A clamping fixture for bundling sheet materials comprising; a base, stationary guide rails secured to said base, respective pairs of movable bars disposed at right angles relative to each other one above the other, said pairs of movable bars including slide blocks at opposite ends slidably engaged on said stationary rails, respective bearing blocks connecting said movable bars together at the intersection of each upper and lower bar whereby each movable bar of a pair is movable in parallel relationship to the other, spring means for drawing the individual bars of each pair toward each other, actuating means connected to each of said bars for moving said bars individually away from each other, an angular standard secured to each of said slide blocks and adapted to receive a bundle of sheet material for engagement at the corners thereof, said standards and bearing blocks movable toward each other under the influence of said spring means to conform to the contour of the bundle to maintain the same in position for fastening, and said actuating means arranged for drawing said bearing blocks and standards away from each other to receive said bundle.

HARRY D. CULVER.

References Cited in the file of this patent

UNITED STATES PATENTS

| Number | Name | Date |
|---|---|---|
| 919,007 | Hargrave | Apr. 20, 1909 |
| 1,246,557 | Crowder | Nov. 13, 1917 |
| 1,577,701 | Edmond | Mar. 23, 1926 |
| 2,418,550 | Edwards | Apr. 8, 1947 |

FOREIGN PATENTS

| Number | Country | Date |
|---|---|---|
| 4,636 | Great Britain | Feb. 24, 1902 |
| 19,722 | Denmark | Jan. 8, 1915 |
| 681,689 | France | Feb. 3, 1930 |